United States Patent
Kuroda

(10) Patent No.: US 10,642,135 B2
(45) Date of Patent: *May 5, 2020

(54) PROJECTOR

(71) Applicant: FUJIFILM Corporation, Tokyo (JP)

(72) Inventor: Yasuto Kuroda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,363

(22) Filed: Jul. 24, 2019

(65) Prior Publication Data

US 2019/0346750 A1 Nov. 14, 2019

Related U.S. Application Data

(63) Continuation of application No. 16/140,553, filed on Sep. 25, 2018, now Pat. No. 10,409,145, which is a continuation of application No. PCT/JP2017/010927, filed on Mar. 17, 2017.

(30) Foreign Application Priority Data

Mar. 30, 2016 (JP) .................. 2016-068890

(51) Int. Cl.
| | |
|---|---|
| *G03B 21/28* | (2006.01) |
| *G03B 21/14* | (2006.01) |
| *G02B 7/02* | (2006.01) |
| *H04N 9/31* | (2006.01) |
| *G02B 7/00* | (2006.01) |
| *G03B 21/00* | (2006.01) |
| *H04N 5/74* | (2006.01) |
| *G02B 27/09* | (2006.01) |
| *G03B 21/20* | (2006.01) |
| *G02B 7/182* | (2006.01) |

(52) U.S. Cl.
CPC ............ *G03B 21/142* (2013.01); *G02B 7/00* (2013.01); *G02B 7/021* (2013.01); *G02B 7/022* (2013.01); *G02B 7/023* (2013.01); *G02B 27/0955* (2013.01); *G03B 21/00* (2013.01); *G03B 21/14* (2013.01); *G03B 21/2066* (2013.01); *G03B 21/28* (2013.01); *H04N 5/74* (2013.01); *G02B 7/182* (2013.01); *H04N 9/3141* (2013.01)

(58) Field of Classification Search
CPC ...... G03B 21/28; G03B 21/142; G03B 21/14; G02B 7/023; G02B 7/022; H04N 9/3141
See application file for complete search history.

(56) References Cited

U.S. PATENT DOCUMENTS

| | | | |
|---|---|---|---|
| 10,409,145 B2 * | 9/2019 | Kuroda .................. | G02B 7/00 |
| 2010/0066986 A1 * | 3/2010 | Lin ....................... | G03B 21/28 |
| | | | 353/101 |

* cited by examiner

*Primary Examiner* — Ryan D Howard
(74) *Attorney, Agent, or Firm* — JCIPRNET

(57) ABSTRACT

A projector includes a projection lens, a projector body, and an angle adjustment unit. In the projection lens, a U-shaped optical path is formed of optical axes CL1 to CL3. A lens barrel is a U-shaped barrel. The angle adjustment unit includes a fitting portion, a mounting flange, a fixing unit, a mount ring, and bearings. The projection lens is supported so as to be rotationally movable around the optical axis CL1. The fixing unit includes a mounting hole, a fixing screw, and a screw hole. The mounting hole is formed in the shape of an arc. The fixing screw is screwed with the screw hole through the mounting hole, so that the lens barrel is fixed to a housing.

20 Claims, 11 Drawing Sheets

PROJECTOR

CROSS-REFERENCE TO RELATED APPLICATIONS

This is a continuation application of and claims the priority benefit of a prior application Ser. No. 16/140,553 filed on Sep. 25, 2018, now allowed. The prior application Ser. No. 16/140,553 is a Continuation of PCT International Application No. PCT/JP2017/010927 filed on 17 Mar. 2017, which claims priority under 35 U.S.C § 119(a) to Japanese Patent Application No. 2016-068890 filed on 30 Mar. 2016. Each of the above application(s) is hereby expressly incorporated by reference, in its entirety, into the present application.

BACKGROUND OF THE INVENTION

1. Field of the Invention

The present invention relates to a projector.

2. Description of the Related Art

In recent years, a projector on which an image forming panel, such as a liquid crystal display or a digital micromirror device (DMD), is mounted has been widespread and the performance of the projector has been improved.

JP2002-268033A discloses a liquid crystal projector that irradiates a transmission-type liquid crystal panel with light emitted from a light source and enlarges and projects an image, which is displayed on the liquid crystal panel, onto a screen through a projection lens. Further, the liquid crystal projector disclosed in JP2002-268033A includes: a dichroic mirror that separates light emitted from the light source into light having an R component, light having a G component, and light having a B component; liquid crystal panels that are irradiated with the light having an R component, the light having a G component, and the light having a B component that are separated by the dichroic mirror, respectively; and a prism that combines an R-image, a G-image, and a B-image formed by being transmitted through the respective liquid crystal panels.

The liquid crystal projector disclosed in JP2002-268033A is adapted so that a case holding the projection lens, the transmission-type liquid crystal panel, and the prism is rotationally movable relative to a lamp housing for housing the light source. Accordingly, an image can be projected onto the screen while the inclination angle of the optical axis of the projection lens with respect to the light source is changed.

SUMMARY OF THE INVENTION

In a case in which an image is projected onto the screen by the projector, it is necessary to adjust a projection position where an image is to be projected onto a screen, particularly, a position in an up-down direction to allow a user to easily observe the image projected onto the screen. However, in a case in which the projection position where an image is to be projected onto the screen is to be adjusted in the liquid crystal projector disclosed in JP2002-268033A, the projection position is adjusted while the inclination angle of the optical axis of the projection lens is changed. That is, since changing the inclination angle of the optical axis of the projection lens means that a distance between the projection lens and the screen is changed in the direction of the optical axis of the projection lens, the focus of the projection lens also should be changed whenever the inclination angle of the optical axis of the projection lens is changed.

The invention has been made in consideration of the above-mentioned circumstances, and an object of the invention is to provide a projector that allows a user to easily perform work for adjusting a projection position where an image is to be projected onto a screen.

In order to achieve the object, a projector of the invention includes an image forming panel, a light source, a housing, a projection lens, and an angle adjustment unit that adjusts a mounting angle of the projection lens mounted on the housing around a first optical axis. The image forming panel displays an image. The light source illuminates the image forming panel. The housing houses the image forming panel and the light source. The projection lens includes a first optical system, a first reflective member, a second reflective member, a second optical system, and a lens barrel. The first optical system focuses illumination light emitted from the image forming panel illuminated by the light source. The first reflective member is disposed so as to be inclined with respect to a first optical axis of the first optical system and deflects the first optical axis to form a second optical axis. The second reflective member is disposed so as to be inclined with respect to the second optical axis and deflects the second optical axis to form a third optical axis parallel to the first optical axis in a plane including the first optical axis and the second optical axis. The second optical system projects illumination light, which is deflected to the third optical axis by the second reflective member, onto a projection surface. The lens barrel holds the first optical system, the first reflective member, the second reflective member, and the second optical system and is mounted on a barrel-mounting surface of the housing. The angle adjustment unit adjusts a mounting angle of the projection lens mounted on the housing around the first optical axis.

It is preferable that the lens barrel is a U-shaped barrel including a first holding member holding the first optical system, a second holding member holding the second optical system, and a joint portion joining the first holding member to the second holding member, and relationships of "H1<R1" and "W<R1" are satisfied in a case in which a distance between the first optical axis and an upper end of the housing in an up-down direction of the housing orthogonal to the first optical axis is denoted by H1, a distance between the first optical axis and one side surface of the housing in a lateral direction of the housing orthogonal to the first optical axis and the up-down direction is denoted by W, and a distance between the first optical axis and a portion of the second holding member, which is closest to the first optical axis, is denoted by R1 in an interference region where the second holding member housing the second optical system protrudes toward the housing from the barrel-mounting surface.

It is preferable that the housing includes a corner where the upper end and the one side surface cross each other and a relationship of "L<R1" is satisfied in a case in which a distance between the first optical axis and the corner is denoted by L.

It is preferable that relationships of "R2<H1" and "R2<H2" are satisfied in a case in which a distance between the first optical axis and a lower end of the housing in the up-down direction is denoted by H2 and a distance between the third optical axis and a maximum outer diameter of the second holding member in a radial direction is denoted by R2.

It is preferable that the angle adjustment unit adjusts the angle at least between a first mounting angle where the first optical axis and the third optical axis coincide with each other in the lateral direction and a second mounting angle where the first optical axis and the third optical axis coincide with each other in the up-down direction.

It is preferable that the angle adjustment unit supports the lens barrel so that the lens barrel is rotationally movable relative to the housing.

It is preferable that the angle adjustment unit includes a long hole that is provided in one of the lens barrel and the housing, and a fixing screw that is screwed with the other of the lens barrel and the housing through the long hole.

It is preferable that the angle adjustment unit includes a long hole and a fixing screw and supports the lens barrel so that the lens barrel is rotationally movable relative to the housing, and one end of the long hole is in contact with the fixing screw in a state in which the projection lens is positioned at the first mounting angle and the other end of the long hole is in contact with the fixing screw in a state in which the projection lens is positioned at the second mounting angle.

It is preferable that the angle adjustment unit includes a plurality of mounting holes provided in one of the lens barrel and the housing around the first optical axis and a fixing screw screwed with the other of the lens barrel and the housing through any one of the plurality of mounting holes.

It is preferable that the angle adjustment unit includes a plurality of mounting holes and a fixing screw and supports the lens barrel so that the lens barrel is rotationally movable relative to the housing, and the plurality of mounting holes include a first mounting hole with which the fixing screw is screwed in a state in which the projection lens is positioned at the first mounting angle, a second mounting hole with which the fixing screw is screwed in a state in which the projection lens is positioned at the second mounting angle, and third mounting holes which are arranged between the first mounting hole and the second mounting hole at equal angular intervals.

According to the invention, it is possible to easily adjust a projection position where an image is to be projected onto a screen, and to easily perform work for adjusting the projection position without needing to change a focus after the adjustment of a projection position.

DESCRIPTION OF THE PREFERRED EMBODIMENTS

First Embodiment

Figure 1:
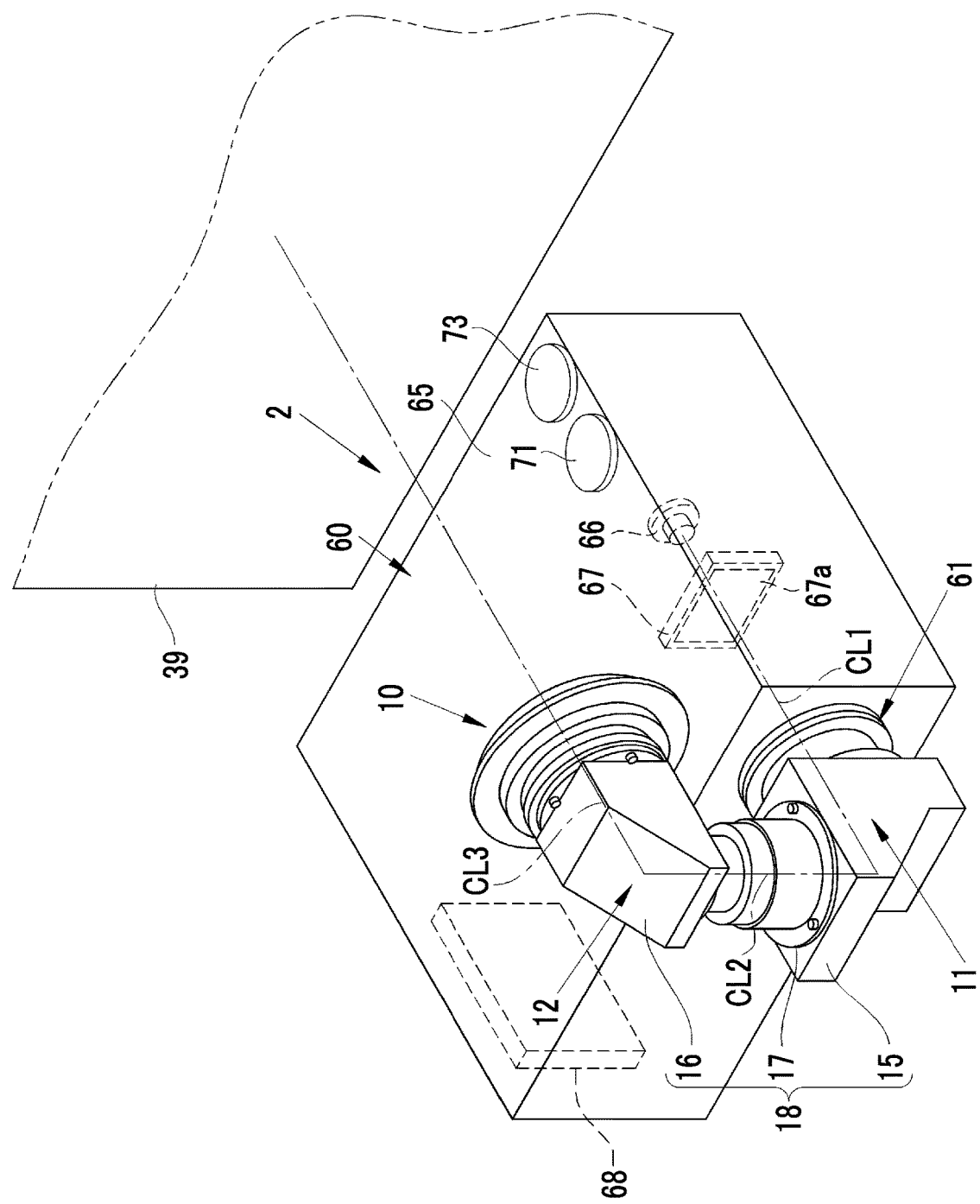
FIG. 1 is a perspective view of a projector of the invention.

As shown in FIG. 1, a projector 2 of this embodiment includes a projection lens 10, a projector body 60, and an angle adjustment unit 61.

Figure 2:
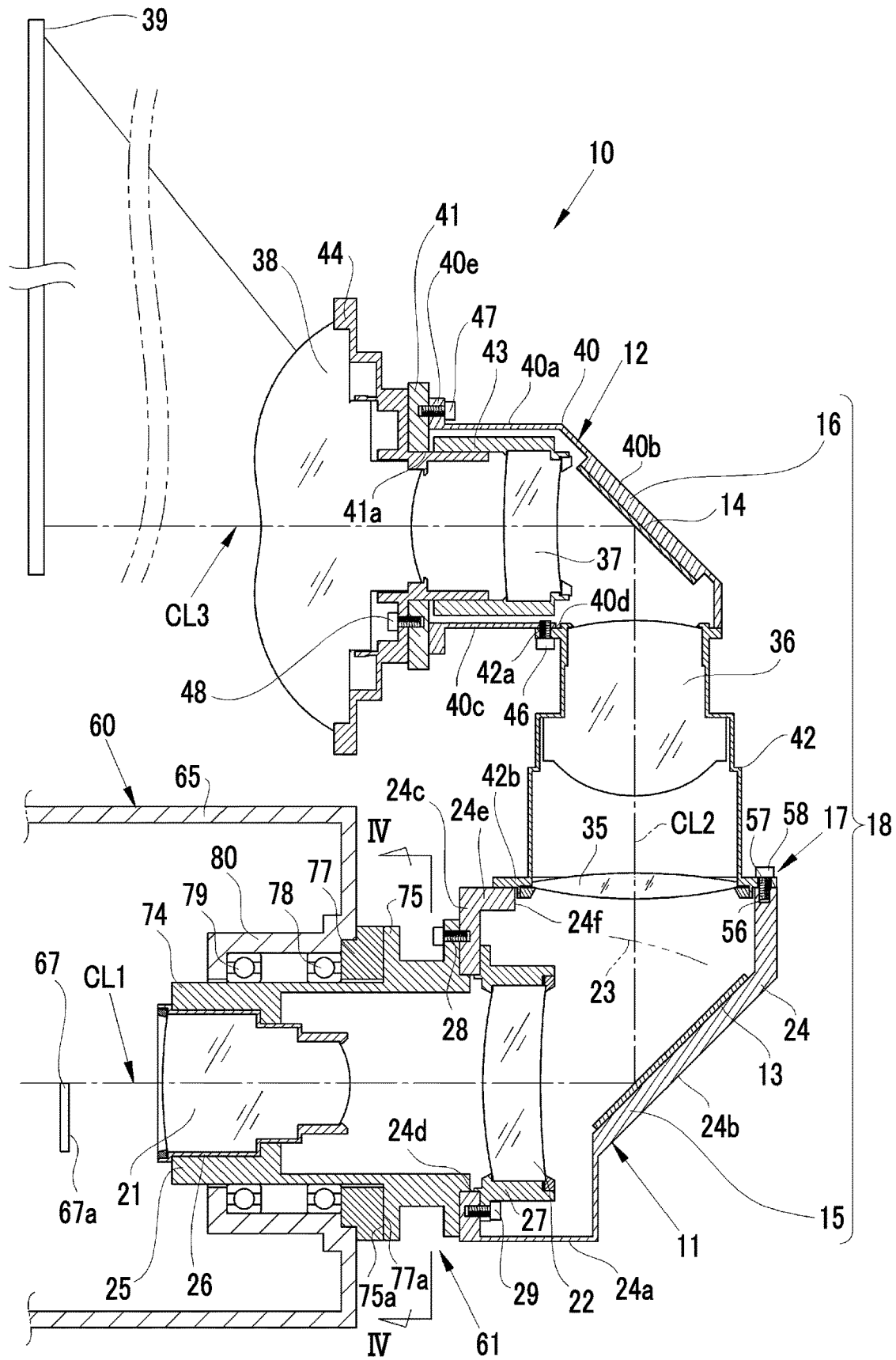
FIG. 2 is a longitudinal sectional view of the projector.

As shown in FIG. 2, the projection lens 10 includes a first optical system 11, a second optical system 12, a first mirror 13 serving as a first reflective member, a second mirror 14 serving as a second reflective member, a first holding member 15, a second holding member 16, and a joint portion 17. The first holding member 15, the second holding member 16, and the joint portion 17 form a lens barrel 18.

The first optical system 11 includes a first lens 21 and a second lens 22. Each of these first and second lenses 21 and 22 is shown as a single lens for simplification in FIG. 2, but is actually formed of a plurality of lens groups. The first optical system 11 focuses illumination light emitted from an image forming panel 67. In this embodiment, the first optical system 11 forms an image, which is formed on the image forming panel 67, on an imaging plane 23 as an intermediate image.

The first mirror 13 is disposed between the first optical system 11 and the imaging plane 23 of the intermediate image that is formed by the first optical system 11. The first mirror 13 deflects an optical axis CL1 of the first optical system 11 by reflection to form an optical axis CL2. In this embodiment, the first mirror 13 deflects the optical axis CL1 by an angle of 90° to form the optical axis CL2.

The first holding member 15 integrally holds the first optical system 11 and the first mirror 13. The first holding member 15 includes a first body part 24, a mounting tube 25, a first lens frame 26, and a second lens frame 27. The first body part 24 is formed of a square tube having a substantially rectangular parallelepiped shape. One corner of a lower plate 24a of the first body part 24 is cut obliquely, so that an inclined surface portion 24b is formed. The first mirror 13 is fixed to the inner surface of the inclined surface portion 24b.

A first mounting hole 24d of the first optical system 11 is formed in an inlet-side front plate 24c that faces the inclined surface portion 24b. The mounting tube 25, the first lens frame 26, and the second lens frame 27 are mounted on the first mounting hole 24d by mounting screws 28 and 29. Further, the mounting tube 25, the first lens frame 26, and the second lens frame 27 may be fixed to the first mounting hole 24d by using an adhesive instead of or in addition to the mounting screws 28 and 29 and the like. A second mounting hole 24f is formed in an upper plate 24e of the first body part 24 of the first holding member 15.

The mounting tube 25 includes a fitting portion 74 and a mounting flange 75 of the angle adjustment unit 61 to be described later.

The second optical system 12 includes a third lens 35, a fourth lens 36, a fifth lens 37, and a sixth lens 38. Each of the fourth to sixth lenses 36 to 38 is shown as a single lens for simplification in FIG. 2, but is actually formed of a plurality of lens groups. The second optical system 12 enlarges the intermediate image, which is formed on the imaging plane 23 by the first optical system 11, and projects the enlarged intermediate image onto, for example, a screen 39 that is a projection target. The first optical system 11 and the second optical system 12 are described in detail in "an optical system for projection and a projection-type display device" of, for example, JP2015-035085, JP2015-045989, and the like, and optical systems described in these can be used as the first optical system 11 and the second optical system 12. According to the optical system for projection and the projection-type display device, an optical system of which various aberrations are satisfactorily corrected at a wide angle and which has high projection performance is obtained.

The second mirror 14 is disposed between the third and fourth lenses 35 and 36 of the second optical system 12. The second mirror 14 deflects the optical axis CL2 by reflection to form an optical axis CL3. In this embodiment, the second mirror 14 deflects the optical axis CL2 by an angle of 90° to form the optical axis CL3.

In this embodiment, as described above, an incidence-side optical axis CL1 of the first optical system 11 is reflected by the first mirror 13, is deflected at an angle of 90°, and becomes an emission-side optical axis CL2. Further, an incidence-side optical axis CL2 of the second optical system 12 is reflected by the second mirror 14, is deflected at an angle of 90°, and becomes an emission-side optical axis CL3. That is, the optical axis CL3 is parallel to the optical axis CL1 in a plane including the optical axes CL1 and CL2. The optical axes CL1 to CL3 correspond to first to third optical axes of the invention.

The second holding member 16 integrally holds the second optical system 12 and the second mirror 14. The second holding member 16 includes a second body part 40, a mounting plate 41, a third lens frame 42, a fourth lens frame 43, and a fifth lens frame 44. The second body part 40 is formed of a square tube having a substantially rectangular parallelepiped shape. One corner of an upper plate 40a of the second body part 40 is cut obliquely, so that an inclined surface portion 40b is formed. The second mirror 14 is fixed to the inner surface of the inclined surface portion 40b.

A third mounting hole 40d is formed in a lower plate 40c that faces the inclined surface portion 40b in a vertical direction. An emission-side end face of the third lens frame 42 is inserted into the third mounting hole 40d from below in the vertical direction. A flange 42a is formed at the emission-side end face of the third lens frame 42. The flange 42a and the lower plate 40c are fixed to each other by mounting screws 46.

A flange 40e extends from a front end face that faces the inclined surface portion 40b in a horizontal direction. The mounting plate 41 is fixed to the flange 40e by mounting screws 47. The mounting plate 41 includes a mounting hole 41a. The fifth lens frame 44, which holds the sixth lens 38, is inserted into the mounting hole 41a. The fifth lens frame 44 is fixed to the mounting plate 41 by mounting screws 48. The fourth lens frame 43 is fitted around the incidence-side end portion of the fifth lens frame 44.

Further, a flange 42b is formed at the incidence-side end face of the third lens frame 42. Mounting holes 57 to be described later are formed in the flange 42b.

As shown in FIG. 2, the joint portion 17 includes screw holes 56, mounting holes 57, and mounting screws 58. One of the first and second holding members 15 and 16 is provided with the screw holes 56. In this embodiment, the upper plate 24e of the first holding member 15 is provided with the screw holes 56. The other of the first and second holding members 15 and 16 is provided with the mounting holes 57. In this embodiment, the flange 42b of the second holding member 16 is provided with the mounting holes 57. The mounting screws 58 are inserted into the mounting holes 57 and are fastened to the screw holes 56 to fix the first holding member 15 to the second holding member 16.

The first and second holding members 15 and 16 are individually assembled. The first and second holding members 15 and 16 are joined to each other through the joint portion 17 in a state in which the emission-side optical axis CL2 of the first optical system 11 and the incidence-side optical axis CL2 of the second optical system 12 are aligned with each other. As a result, the lens barrel 18 is assembled. In the lens barrel 18 that is assembled in this way, a U-shaped optical path is formed by the optical axis CL2, the incidence-side optical axis CL1 of the first optical system 11, and the emission-side optical axis CL3 of the second optical system 12. For this reason, the lens barrel 18, which holds the first optical system 11, the second optical system 12, the first mirror 13, and the second mirror 14, is a U-shaped barrel.

The projection lens 10 is mounted on the projector body 60 through the angle adjustment unit 61. The projector body 60 is adapted so that a light source 66, the image forming panel 67, and a control unit 68 are housed in a housing 65 having a substantially rectangular parallelepiped shape.

A transmission-type liquid crystal panel is used as the image forming panel 67. The light source 66 is disposed on the back side of the image forming panel 67, that is, the side of the image forming panel 67 opposite to the projection lens 10. A light emitting diode (LED), which simultaneously emits light having three colors of RGB, is used as the light source 66, and the light source 66 illuminates the image forming panel 67. A xenon lamp, a halogen lamp, and a super high-pressure mercury lamp, which emit white light, may be used instead of the LED. The projection lens 10 projects illumination light, which is emitted from the image forming panel 67 illuminated by the light source 66, onto a projection surface, for example, the screen 39.

The control unit 68 turns on the light source 66 and allows images, which have three colors of RGB, to be displayed on an image forming surface 67a. The control unit 68 performs the following processing as well. In a case in which, for example, the projection lens 10 includes an electrical control function and the control unit 68 receives an operation signal of a zoom dial 71, the control unit 68 adjusts the size of the image to be projected onto the screen 39. In a case in which the control unit 68 receives an operation signal of a focus dial 73, the control unit 68 operates a focus adjustment mechanism (not shown) of the projection lens 10 to adjust the focus of the image projected onto the screen 39.

As shown in FIG. 2, an image is projected onto the screen 39 above the emission-side optical axis CL3 of the second optical system 12. The center of the image forming panel 67 is fixed so as to be shifted in a direction opposite to a direction in which the central position of the projected image (the projection surface of the screen 39) is shifted from the incidence-side optical axis CL1 of the first optical system 11, that is, to the lower side in the direction of the emission-side optical axis CL2 of the first optical system 11.

The angle adjustment unit 61 includes a fitting portion 74, a mounting flange 75, a fixing unit 76 (see FIG. 3), a mount ring 77, bearings 78 and 79, and a mount holding portion 80. The mount holding portion 80 is formed in a cylindrical shape, and is formed integrally with the housing 65. The mount holding portion 80 holds the mount ring 77 and the bearings 78 and 79.

The fitting portion 74 is provided at the incidence-side end portion of the mounting tube 25, and the mounting flange 75 is provided on the emission side of the fitting portion 74. The fitting portion 74 is formed in a columnar shape so that the outer peripheral surface of the fitting portion 74 is fitted to the inner peripheral surfaces of the bearings 78 and 79.

The bearings 78 and 79 are radial bearings, and are disposed between the mount holding portion 80 and the fitting portion 74. The first optical system 11 is held so that the position of the optical axis CL1 is aligned with the central axes of the bearings 78 and 79. Accordingly, the projection lens 10 is supported so as to be rotationally movable around the optical axis CL1.

The mount ring 77 is formed in the shape of a ring that has an inner diameter corresponding to the outer diameter of the mounting tube 25. The mount ring 77 is fitted to the mount holding portion 80 and covers and hides the bearings 78 and 79.

Figure 3:
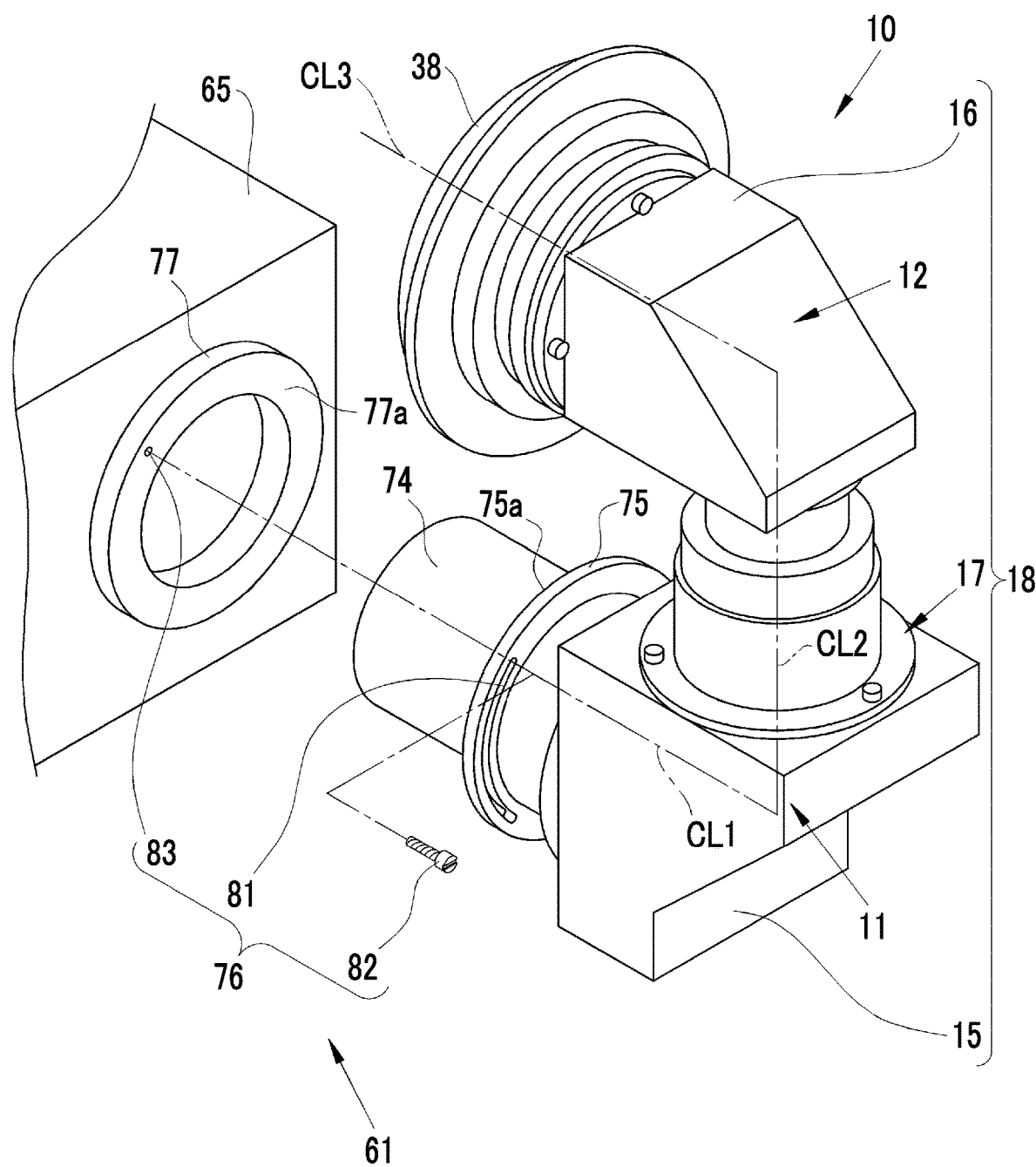
FIG. 3 is a perspective view showing the structure of a fixing unit.

As shown in FIG. 3, the mount ring 77 includes a mounting surface 77*a* (barrel-mounting surface). The mounting surface 77*a* is a flat surface that is orthogonal to the central axes of the bearings 78 and 79, and faces a mounting surface 75*a* of the mounting flange 75 in a state in which the fitting portion 74 is fitted to the bearings 78 and 79.

The fixing unit 76 includes a mounting hole 81, a fixing screw 82, and a screw hole 83. The mounting hole 81 is formed in one of the mounting flange 75 and the mount ring 77. In this embodiment, the mounting hole 81 is formed in the mounting flange 75. The mounting hole 81 is an arc-shaped long hole that passes through the mounting flange 75 and has a center on the optical axis CL1. Further, in this embodiment, the mounting hole 81 is formed in the shape of an arc having a central angle θ1 (see FIG. 4) of 90°. The screw hole 83 is formed in the other of the mounting flange 75 and the mount ring 77. In this embodiment, the screw hole 83 is formed in the mount ring 77.

The screw hole 83 is formed on the mounting surface 77*a*. The screw hole 83 is disposed so as to be positioned in the mounting hole 81, and is screwed with the fixing screw 82 inserted into the mounting hole 81. Accordingly, the mounting surfaces 75*a* and 77*a* are in close contact with each other and the mounting flange 75 is fastened to the mount ring 77 with the screw. That is, the lens barrel 18 is fixed to the housing 65 by the fixing unit 76.

Figure 4:
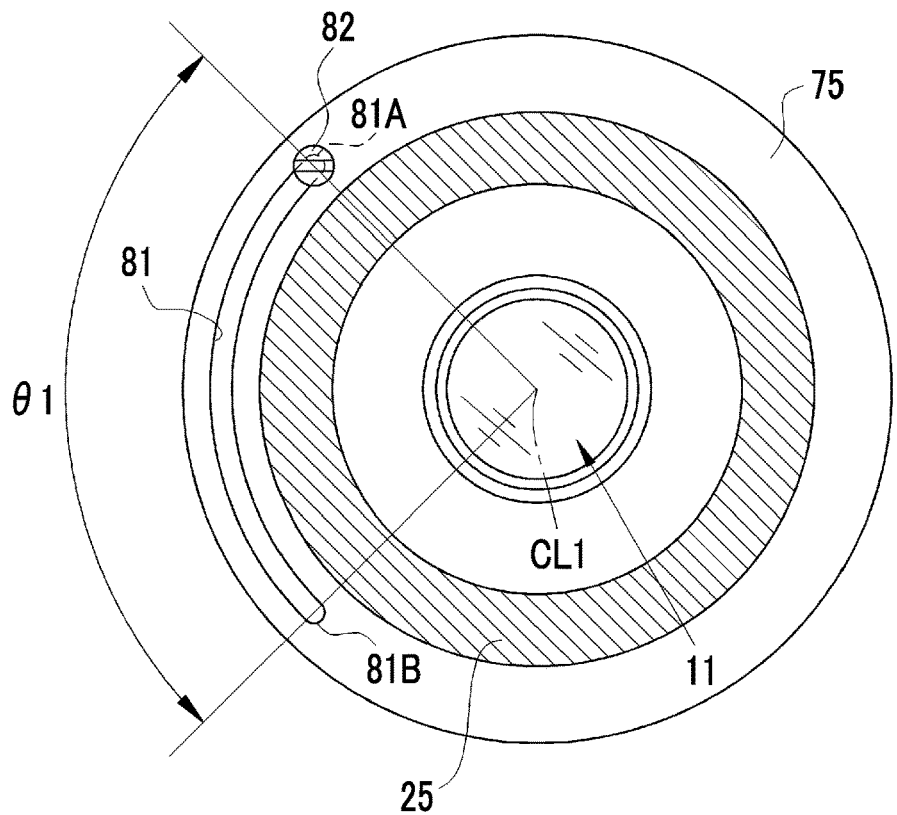
FIG. 4 is a cross-sectional view of main portions taken along line Iv-Iv of FIG. 2.
Figure 5:
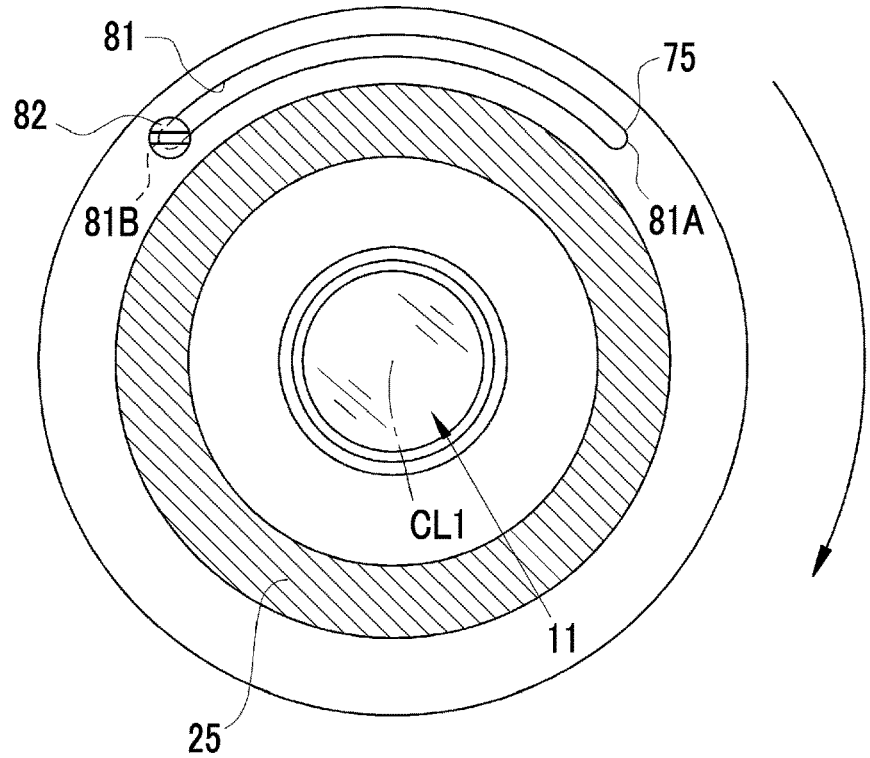
FIG. 5 is a cross-sectional view of main portions showing a state in which a projection lens is rotated clockwise by an angle of 90° from a state shown in FIG. 4.

Since the mounting hole 81 is an arc-shaped long hole as described above, the projection lens 10 can be mounted while the mounting angle of the projection lens 10 mounted on the housing 65 is adjusted around the optical axis CL1. That is, the projection lens 10 is moved rotationally around the optical axis CL1 from a position where the fixing screw 82 is in contact with one end 81A of the mounting hole 81 as shown in FIG. 4 and is screwed with the screw hole 83, and the mounting angle of the projection lens 10 can be adjusted to a position where the fixing screw 82 is in contact with the other end 81B of the mounting hole 81 as shown in FIG. 5 and is screwed with the screw hole 83.

Since the mounting hole 81 has a central angle θ1 of 90° in this embodiment, the angle adjustment unit 61 can adjust the mounting angle of the projection lens 10 in an angular range of 90° around the optical axis CL1. Specifically, the angle adjustment unit 61 can adjust the mounting angle between a first mounting angle shown in FIG. 6 and a second mounting angle shown in FIG. 7. One end 81A of the mounting hole 81 is in contact with the fixing screw 82 at the first mounting angle, and the other end 81B of the mounting hole 81 is in contact with the fixing screw 82 at the second mounting angle.

In the following description, the optical axis CL1 corresponds to an X-axis direction, an up-down direction of the housing 65 orthogonal to the X-axis direction is referred to as a Z-axis direction, and a lateral direction of the housing 65 orthogonal to the X-axis direction and the Z-axis direction is referred to as a Y-axis direction.

Figure 6:
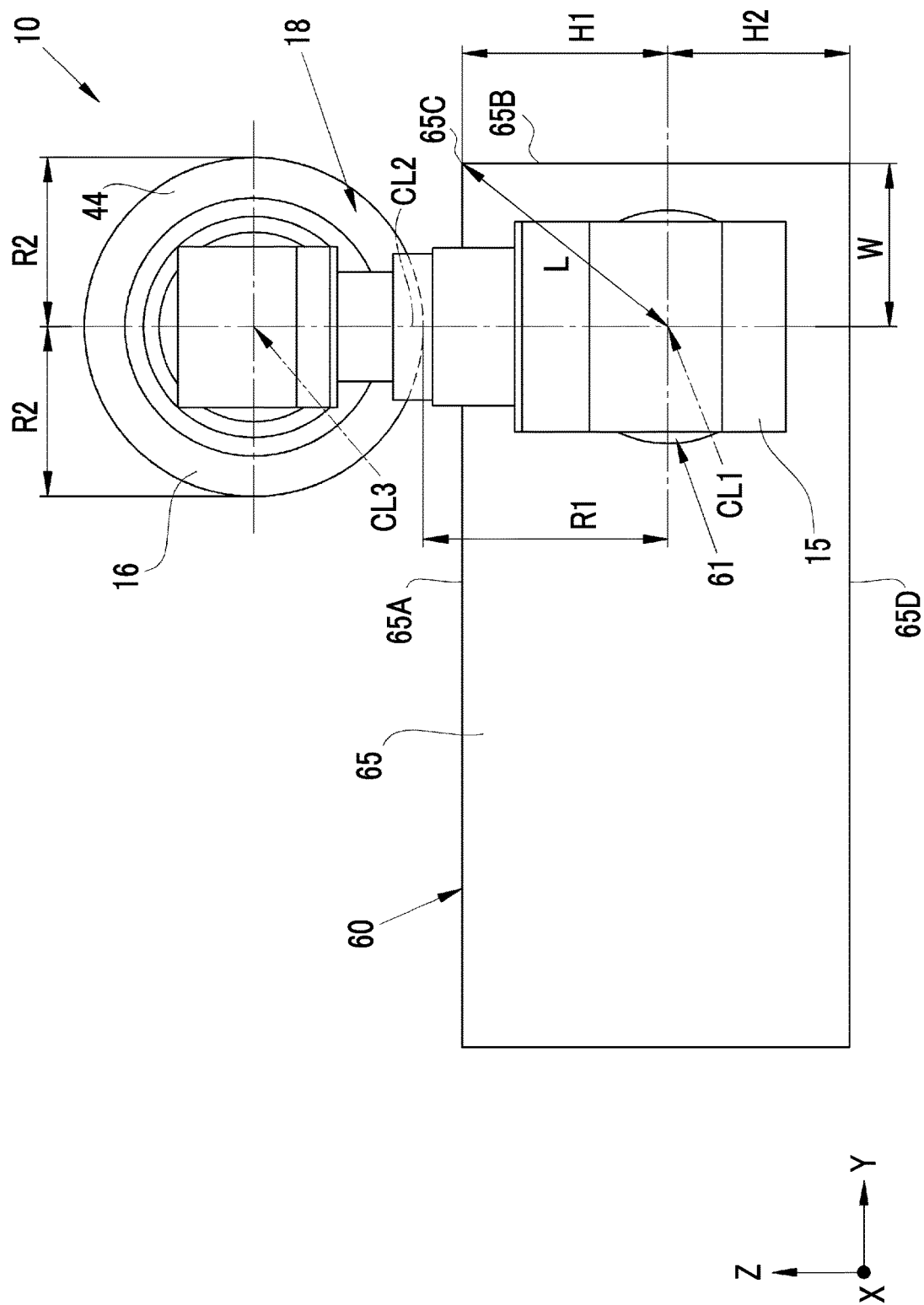
FIG. 6 is a back view showing a positional relationship between a case and the projection lens at a first mounting angle.
Figure 7:
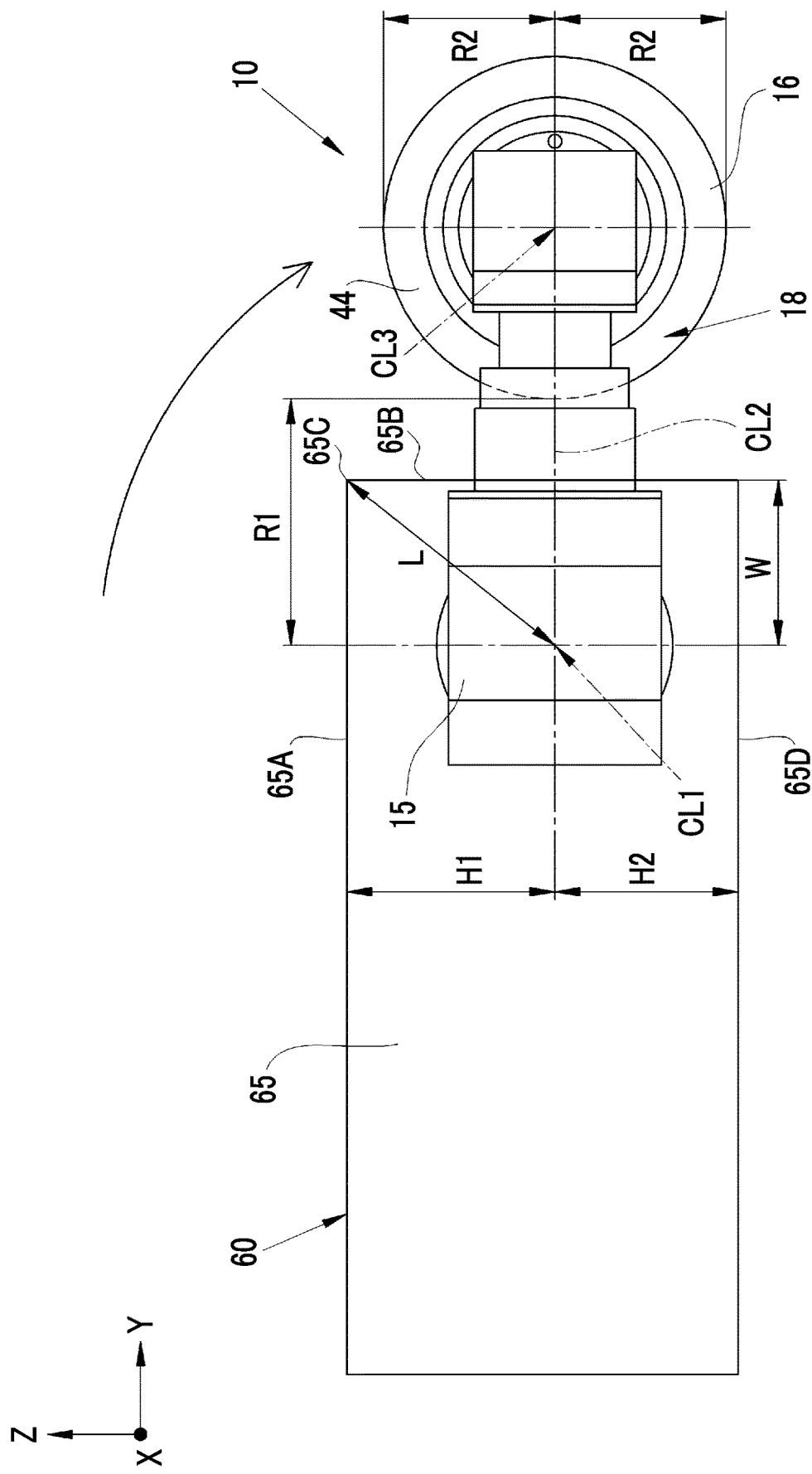
FIG. 7 is a back view showing a positional relationship between the case and the projection lens at a second mounting angle.

As shown in FIG. 6, the optical axis CL1 and the optical axis CL3 of the projection lens 10 coincide with each other in the Y-axis direction at the first mounting angle. Further, as shown in FIG. 7, the optical axis CL1 and the optical axis CL3 coincide with each other in the Z-axis direction at the second mounting angle where the projection lens 10 is rotated clockwise by an angle of 90° from the first mounting angle.

Figure 8:
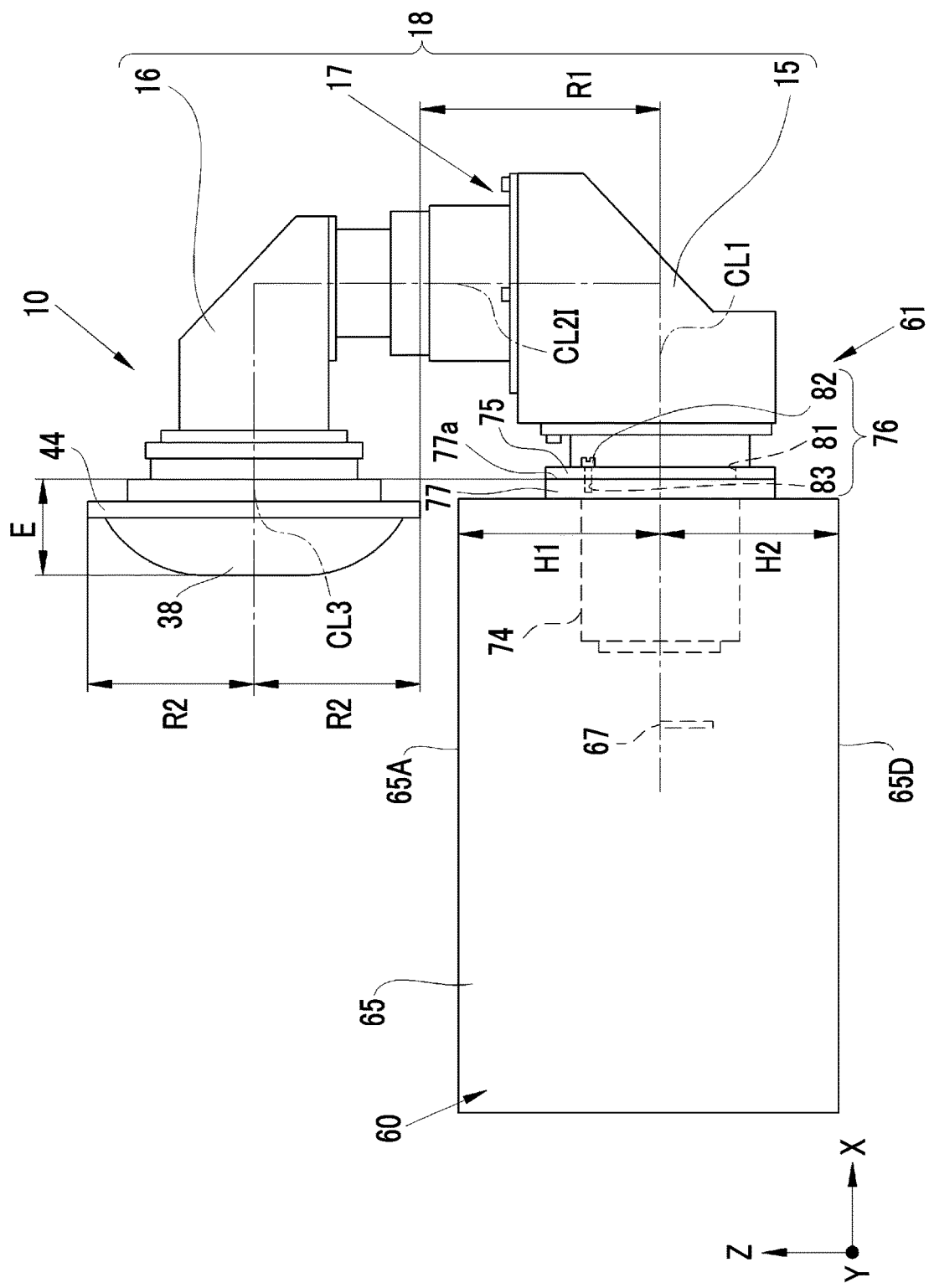
FIG. 8 is a side view showing a positional relationship between the case and the projection lens at the first mounting angle.

Since the lens barrel 18 is a U-shaped barrel as described above, the lens barrel 18 includes a portion where the second optical system 12 and the second holding member 16 protrude toward the housing 65 from the mounting surface 77*a*. The portion where the second optical system 12 and the second holding member 16 protrude toward the housing 65 from the mounting surface 77*a* in the X-axis direction as shown in FIG. 8 is referred to as an interference region E.

In a case in which a distance between the optical axis CL1 and an upper end 65A of the housing 65 in the Z-axis direction is denoted by H1, a distance between the optical axis CL1 and one side surface 65B of the housing 65 in the Y-axis direction is denoted by W, and a distance between the optical axis CL1 and a portion of the second holding member 16, which is closest to the optical axis CL1, is denoted by R1 in the interference region E, the projection lens 10 has relationships of "H1<R1" and "W<R1". Accordingly, since there is a margin in the position of the lens barrel 18 with respect to the upper end 65A and the side surface 65B of the housing 65, the lens barrel 18 is not in contact with the housing 65 and the mounting angle can be smoothly adjusted.

Further, the housing 65 includes a corner 65C where the upper end 65A and the side surface 65B cross each other. In a case in which a distance between the optical axis CL1 and the corner 65C is denoted by L, the projection lens 10 has a relationship of "L<R1". Accordingly, since there is a margin in the position of the lens barrel with respect to the corner 65C, the lens barrel 18 comes into contact with the corner 65C and the mounting angle can be smoothly adjusted in a case in which the lens barrel 18 is moved rotationally.

Furthermore, in a case in which a distance between the optical axis CL1 and a lower end 65D of the housing 65 in the Z-axis direction is denoted by H2 and a distance between the optical axis CL3 and the maximum outer diameter of the second holding member 16 in a radial direction is denoted by R2 in the interference region E, the projection lens 10 has relationships of "R2<H1" and "R2<H2". Accordingly, in a state in which the projection lens 10 shown in FIG. 7 is positioned at the second mounting angle, the projection lens 10 does not protrude from the upper end 65A and the lower end 65D of the housing 65. Since the outer peripheral surface of the fifth lens frame 44 is largest in the interference region E, the distance R2 is a distance between the optical axis CL3 and the outer peripheral surface of the fifth lens frame 44.

In a case in which the projector 2 is used, for example, the projection lens 10 is mounted at the first mounting angle and the image of the image forming panel 67 (see FIG. 1) is enlarged and projected onto the screen 39 by the projection lens 10. Further, in a case in which a user wants to adjust a projection position where an image is to be projected onto the screen 39 to easily observe the image projected onto the screen 39, the user loosens the fixing screw 82 to release the fixing of the projection lens 10 to the housing 65. Then, the user adjusts the mounting angle of the projection lens 10 in the angular range between the first mounting angle and the second mounting angle.

Figure 9:
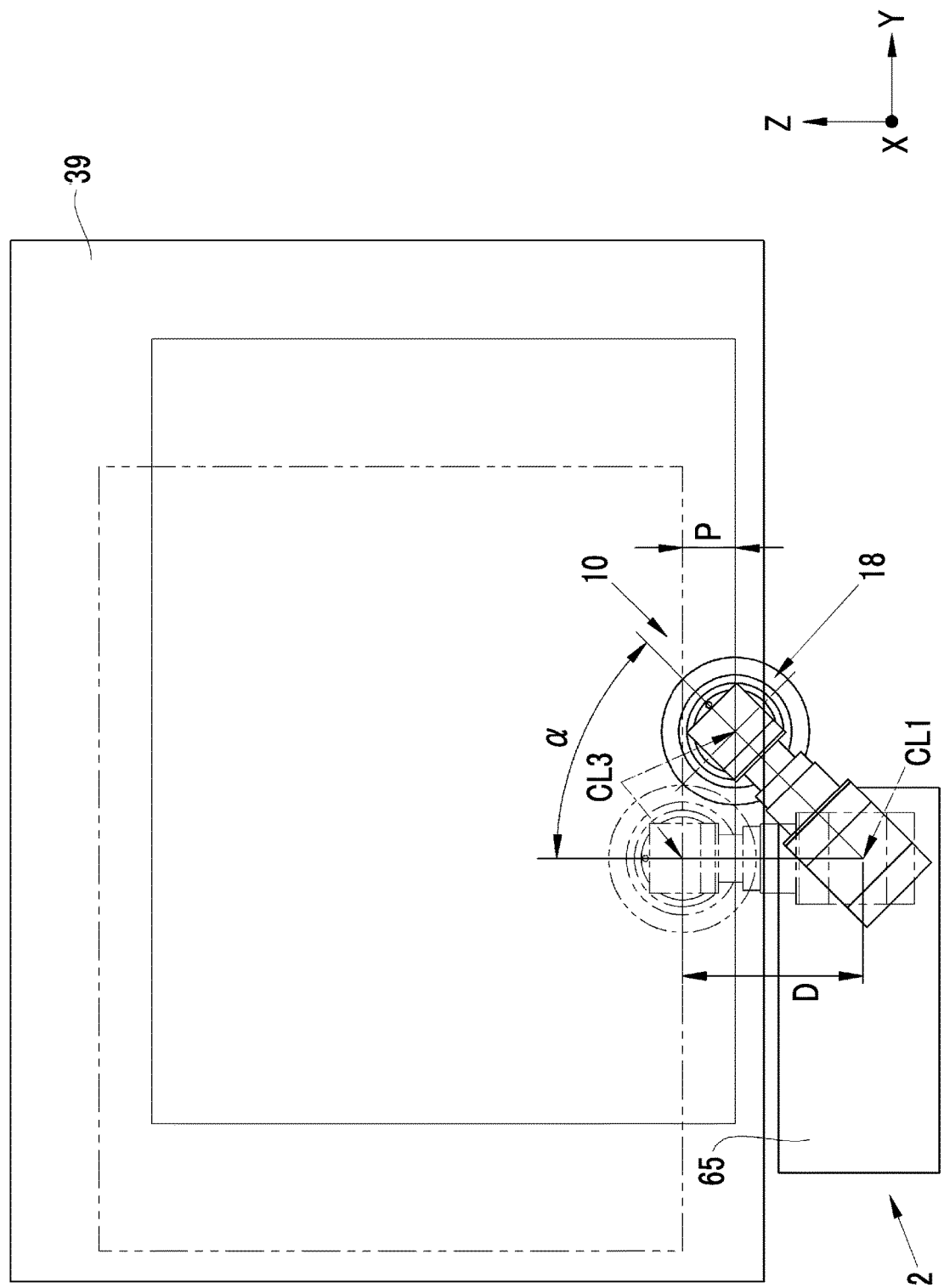
FIG. 9 is a diagram illustrating the adjustment of a projection position where an image is to be projected onto a screen that is performed using a change in the mounting angle of the projection lens.

In a state in which the projection lens 10 is moved rotationally around the optical axis CL1 from the first mounting angle by an angle α as shown in FIG. 9, the fixing screw 82 is tightened to fix the projection lens 10 to the housing 65. In a case in which a difference between the projection position that is obtained in this state and the projection position, which is obtained in a case in which the projection lens 10 is positioned at the first mounting angle and an image is projected, is denoted by P and a distance between the optical axis CL1 and the optical axis CL3 is denoted by D, the projection position can be shifted in the Z-axis direction in the projector 2 by "P=D(1−cos α)"

Since the mounting angle of the projection lens 10 mounted on the housing 65 around the optical axis CL1 can be adjusted in the projector 2 of this embodiment, the projection position where an image is to be projected onto the screen 39 can be easily adjusted. Further, since it is not necessary to adjust the projection position while changing the inclination angle of the optical axis of the projection lens with respect to the screen unlike in the projector in the related art, the focus of the projection lens 10 does not need to be adjusted in a case in which the projection position is to be adjusted.

Second Embodiment

Figure 10:
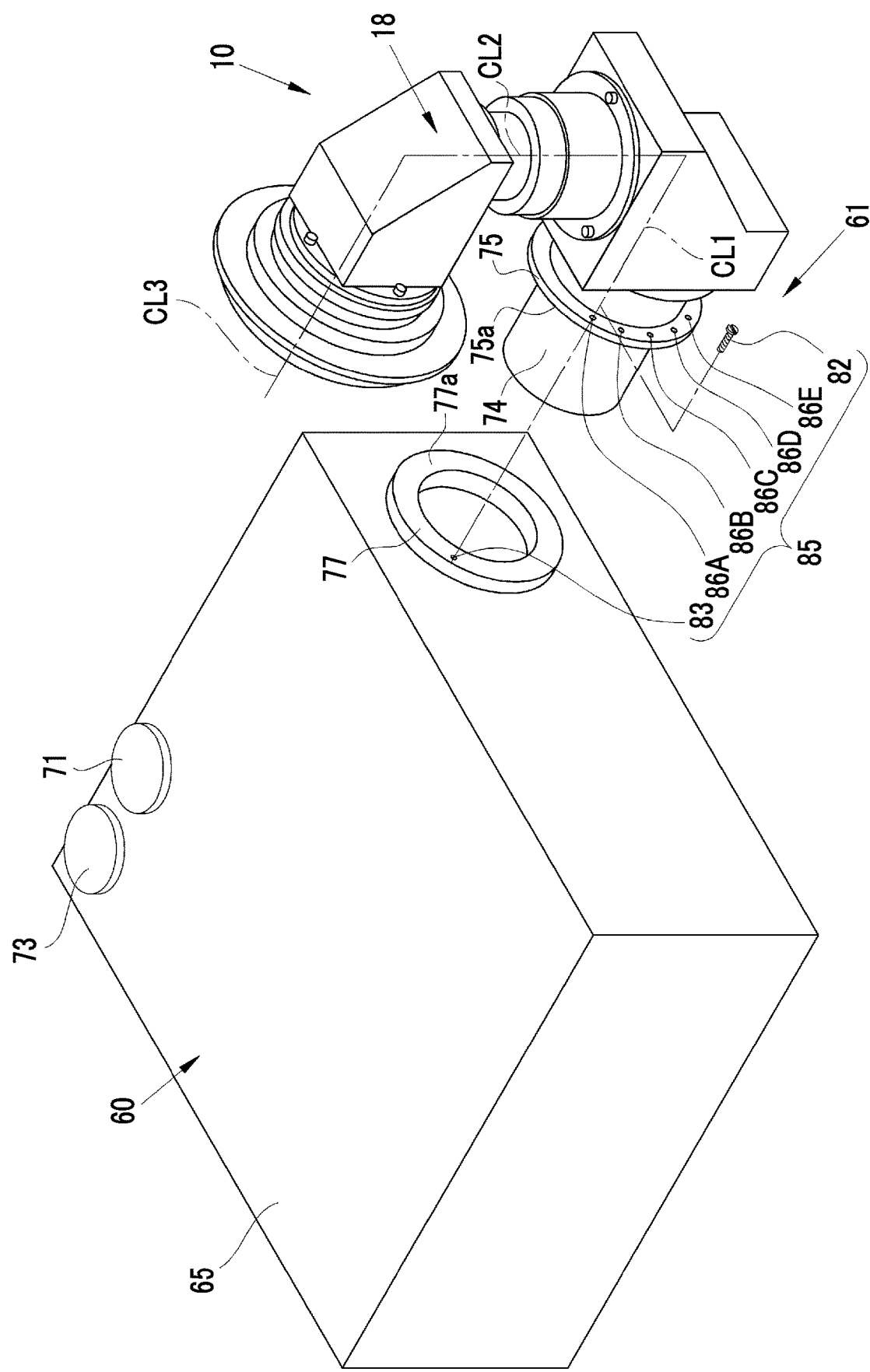
FIG. 10 is a perspective view showing the structure of an angle adjustment unit of a second embodiment.

In the first embodiment, an arc-shaped long hole is formed as the mounting hole 81 of the fixing unit 76 to allow the mounting angle of the projection lens 10 to be adjusted. In contrast, in a second embodiment shown in FIG. 10, a fixing unit 85 includes a plurality of mounting holes 86A to 86E, a fixing screw 82, and a screw hole 83. The same components as those of the first embodiment will be denoted by the same reference numerals as those of the first embodiment, and the repeated description thereof will be omitted.

In this embodiment, the five mounting holes 86A to 86E are arranged around the optical axis CL1. The fixing screw 82 can be screwed with the screw hole 83 through the mounting hole 86A (first mounting hole) in a state in which the projection lens 10 is positioned at a first mounting angle. On the other hand, the fixing screw 82 can be screwed with the screw hole 83 through the mounting hole 86E (second mounting hole) in a state in which the projection lens 10 is positioned at a second mounting angle. As in the first embodiment, the first mounting angle is a mounting angle where the optical axis CL1 and the optical axis CL3 coincide with each other in the Y-axis direction, and the second mounting angle is a mounting angle where the optical axis CL1 and the optical axis CL3 coincide with each other in the Z-axis direction. For this reason, an angular interval of 90° around the optical axis CL1 is provided between the mounting hole 86A and the mounting hole 86E.

Figure 11:
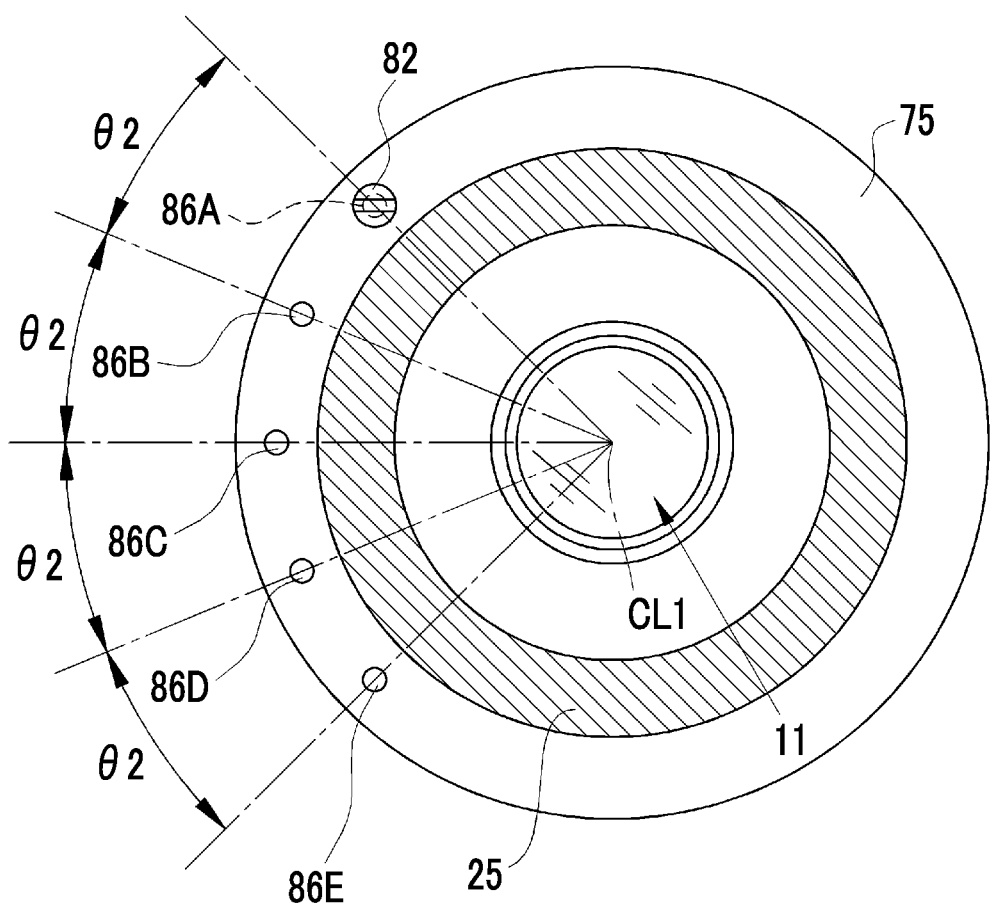
FIG. 11 is a cross-sectional view of main portions around a fixing unit of the second embodiment.

As shown in FIG. 11, the mounting holes 86B to 86D (third mounting holes) are arranged between the mounting holes 86A and 86E at equal angular intervals θ2. Since an angular interval of 90° is provided between the mounting holes 86A and 86E as described above, the mounting holes 86A to 86E are arranged at angular intervals θ2 (θ2=22.5°). The fixing screw 82 is screwed with the screw hole 83 through any one of the mounting holes 86A to 86E, so that the projection lens 10 is fixed to the housing 65.

In a case in which the angle of the projection lens 10 mounted on the housing 65 around the optical axis CL1 is to be adjusted in this embodiment, the fixing screw 82, which is screwed with the screw hole 83 through any one of the mounting holes 86A to 86E, is loosened to release the fixing of the projection lens 10 to the housing 65. The projection lens 10 is moved rotationally around the optical axis CL1 to adjust the mounting angle. Further, the fixing screw 82 is tightened through any one of the mounting holes 86A to 86E, which is different from the mounting hole in a case in which fixing is not yet released, to fix the projection lens 10 to the housing 65. Accordingly, the mounting angle can be adjusted to mounting angles of a plurality of stages corresponding to the positions of the mounting holes 86A to 86E from the first mounting angle to the second mounting angle.

Third Embodiment

Figure 12:
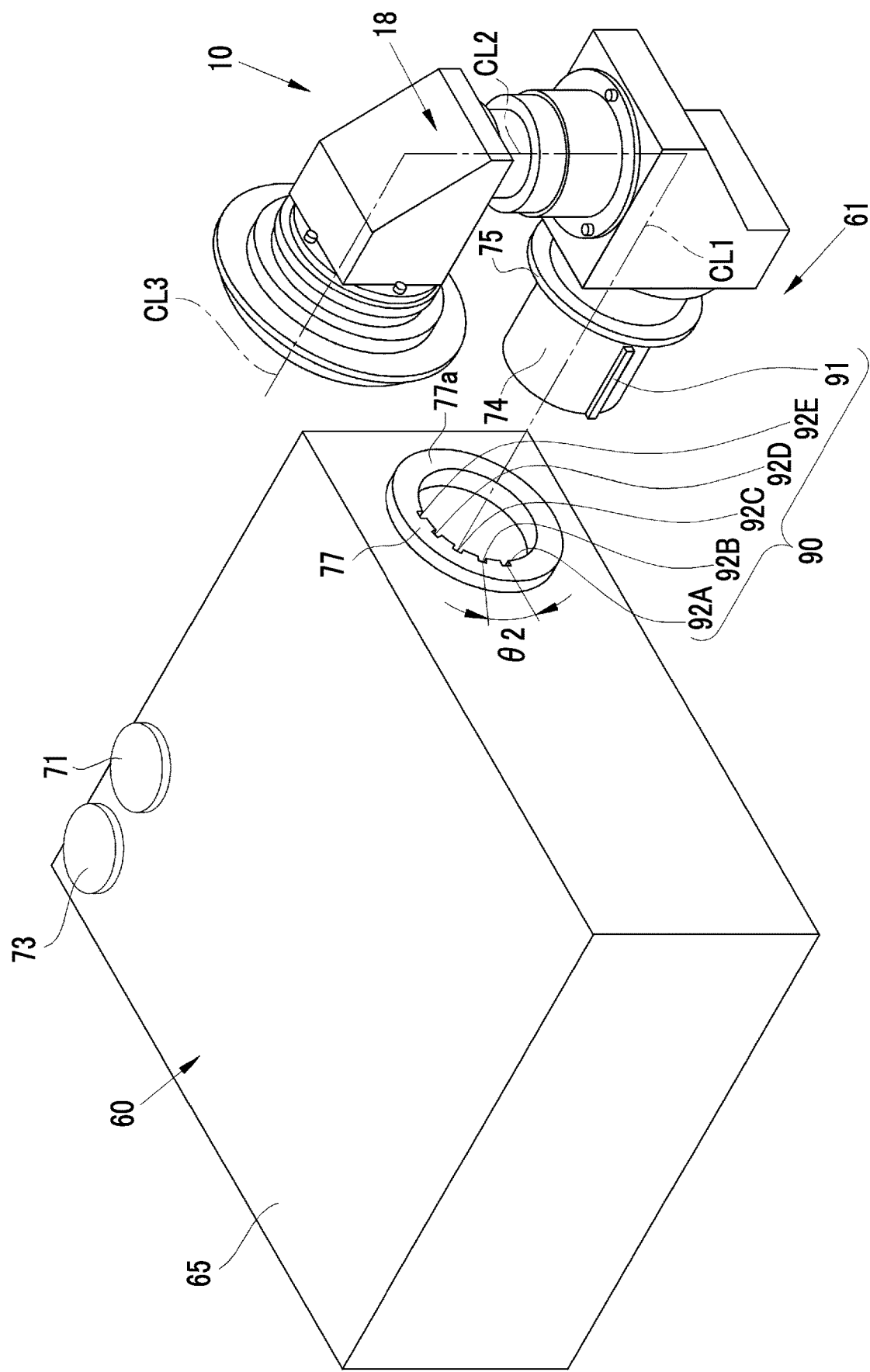
FIG. 12 is a perspective view showing the structure of an angle adjustment unit of a third embodiment.

The fixing unit of the angle adjustment unit 61 includes the mounting hole, the fixing screw, and the screw hole in the first and second embodiments, but is not limited thereto. In a third embodiment shown in FIG. 12, an angle adjustment unit 90 includes a key protrusion 91 and a plurality of key grooves 92A to 92E. The same components as those of the first and second embodiments will be denoted by the same reference numerals as those of the first and second embodiments, and the repeated description thereof will be omitted.

The key protrusion 91 is a columnar protruding portion that is provided on the outer periphery of the fitting portion 74 and extends in parallel to the optical axis CL1. The five key grooves 92A to 92E are grooves which are formed on the mount ring 77 and to which the key protrusion 91 is fitted. The key protrusion 91 can be fitted to the key groove 92A in a state in which the projection lens 10 is positioned at a first mounting angle. On the other hand, the key protrusion 91 can be fitted to the key groove 92E in a state in which the projection lens 10 is positioned at a second mounting angle. As in the first and second embodiments, the first mounting angle is a mounting angle where the optical axis CL1 and the optical axis CL3 coincide with each other in the Y-axis direction, and the second mounting angle is a mounting angle where the optical axis CL1 and the optical axis CL3 coincide with each other in the Z-axis direction. For this reason, an angular interval of 90° around the optical axis CL1 is provided between the key groove 92A and the key groove 92E.

The key grooves 92B to 92D are arranged between the key grooves 92A and 92E at equal angular intervals θ2. Since an angular interval of 90° is provided between the key grooves 92A and 92E as described above, the key grooves 92A to 92E are arranged at angular intervals θ2 (θ2=22.5°).

In a case in which the angle of the projection lens 10 mounted on the housing 65 around the optical axis CL1 is to be adjusted in this embodiment, the fitting portion 74 is fitted to the mount ring 77 and the key protrusion 91 is fitted to any one of the key grooves 92A to 92E. Accordingly, the mounting angle can be adjusted to mounting angles of a plurality of stages corresponding to the positions of the key grooves 92A to 92E from the first mounting angle to the second mounting angle.

The mounting angle of the projection lens 10 mounted on the housing 65 can be adjusted in the angular range of 90° between the first and second mounting angles in the respective embodiments, but the range of the mounting angle is not limited thereto. For example, the mounting angle may be adapted to be capable of being adjusted in the angular range larger than 90° in addition to the first mounting angle and the second mounting angle.

A transmission-type liquid crystal panel has been used as the image forming panel 67 in the above-mentioned embodiments, but a reflection type liquid crystal panel may be used. In this case, the light source 66 is disposed on the front side of the image forming panel 67 and simultaneously emits irradiation light having three colors of RGB. In a case in which a DMD is used as the image forming panel 67, the light source 66 is disposed on the front side of the image forming panel 67 and LEDs having three colors of RGB generate light by time sharing in synchronization with timings at which the DMD forms an image having three colors.

The first holding member 15 of the lens barrel 18 is formed in the shape of a square tube in the respective embodiments, but is not limited thereto. For example, corners of the lower end of the first holding member 15 may be formed in a chamfered shape or a curved shape. Accordingly, even though a distance H2 between the optical axis CL1 and the lower end 65D of the housing 65 in the Z-axis direction is short, the corners of the first holding member 15 does not protrude from the lower end 65D of the housing 65.

A state in which the projector 62 is disposed on a table has been described in the respective embodiments, but the invention may also be applied to a case in which the projector 62 is used while being suspended from the ceiling or the like. Further, an example in which an image is projected onto the screen 39 has been described, but the projection surface is not limited to the screen 39 and the projector 62 can be used as a projector that projects an image onto various projection surfaces.

In the respective embodiments, terms, such as orthogonal and parallel, have been used to represent a positional relationship between the plurality of optical axes or the specific numerical values of an angle, such as 90°, have been used for description. However, these terms or the numerical values include a range to be allowed with an error based on accuracy required for the optical system.

EXPLANATION OF REFERENCES

2: projector
10: projection lens
11: first optical system
12: second optical system
13: first mirror
14: second mirror
15: first holding member
16: second holding member
17: joint portion
18: lens barrel
21: first lens
22: second lens
23: imaging plane
24: first body part
24a: lower plate
24b: inclined surface portion
24c: front plate
24d: first mounting hole
24e: upper plate
24f: second mounting hole
25: mounting tube
26: first lens frame
27: second lens frame
28: mounting screw
29: mounting screw
35: third lens
36: fourth lens
37: fifth lens
38: sixth lens
39: screen
40: second body part
40a: upper plate
40b: inclined surface portion
40c: lower plate
40d: third mounting hole
40e: flange
41: mounting plate
41a: mounting hole
42: third lens frame
42a, 42b: flange
43: fourth lens frame
44: fifth lens frame
46 to 48: mounting screw
56: screw hole
57: mounting hole
58: mounting screw
60: projector body
61: angle adjustment unit
62: projector
65: housing
65A: upper end
65B: side surface
65C: corner
65D: lower end
66: light source
67: image forming panel
67a: image forming surface
68: control unit
71: zoom dial
73: focus dial
74: fitting portion
75: mounting flange
75a: mounting surface
76: fixing unit
77: mount ring
77a: mounting surface
78, 79: bearing
80: mount holding portion
81: mounting hole
81A: one end
81B: the other end
82: fixing screw
83: screw hole
85: fixing unit
86A to 86E: mounting hole
90: angle adjustment unit
91: key protrusion
92A to 92E: key groove

What is claimed is:
1. A projection lens attached to a barrel-mounting surface of a housing including a light source and an image forming panel, the projection lens comprising:

a first optical system that focuses illumination light emitted from the image forming panel illuminated by the light source;
a first reflective member inclined with respect to a first optical axis of the first optical system and deflects the first optical axis to a second optical axis;
a second reflective member inclined with respect to the second optical axis and deflects the second optical axis to a third optical axis;
a second optical system that projects illumination light, which is deflected to the third optical axis by the second reflective member, onto a projection surface; and
a lens barrel that holds the first reflective member, the second reflective member and the second optical system,
wherein the lens barrel is capable to adjust an angle between the lens barrel and the barrel-mounting surface.

2. The projection lens according to claim 1, wherein the first optical axis is parallel to the third optical axis.

3. The projection lens according to claim 1, wherein the lens barrel is composed of at least a first holding member holding the first optical system and a second holding member holding the second optical system.

4. The projection lens according to claim 1 further comprising:
a second holding member holding the second optical system,
wherein the first optical axis extends in a first direction including one side and other side,
the illumination light incidents the first optical system from the one side to the other side, and
in a side view, the second holding member includes a part protruding from the other side to the one side.

5. The projection lens according to claim 1, wherein the lens barrel is rotationally movable relative to the housing.

6. The projection lens according to claim 1, wherein the lens barrel is rotationally movable relative to the housing by a bearing.

7. The projection lens according to claim 2, wherein the lens barrel is composed of at least a first holding member holding the first optical system and a second holding member holding the second optical system.

8. The projection lens according to claim 2 further comprising:
a second holding member holding the second optical system,
wherein the first optical axis extends in a first direction including one side and other side,
the illumination light incidents the first optical system from the one side to the other side, and
in a side view, the second holding member includes a part protruding from the other side to the one side.

9. The projection lens according to claim 3 further comprising:
a second holding member holding the second optical system,
wherein the first optical axis extends in a first direction including one side and other side,
the illumination light incidents the first optical system from the one side to the other side, and
in a side vide, the second holding member includes a part protruding from the other side to the one side.

10. The projection lens according to claim 2, wherein the lens barrel is rotationally movable relative to the housing.

11. The projection lens according to claim 3, wherein the lens barrel is rotationally movable relative to the housing.

12. The projection lens according to claim 4, wherein the lens barrel is rotationally movable relative to the housing.

13. A projector comprising:
the projection lens according to claim 1; and
the housing.

14. The projector according to claim 13 further comprising:
wherein the lens barrel is a U-shaped barrel that includes a first holding member holding the first optical system, a second holding member holding the second optical system, and a joint portion joining the first holding member to the second holding member, and
relationships of "H1<R1" and "W<R1" are satisfied in a case in which a distance between the first optical axis and an upper end of the housing in an up-down direction of the housing orthogonal to the first optical axis is denoted by H1, a distance between the first optical axis and one side surface of the housing in a lateral direction of the housing orthogonal to the first optical axis and the up-down direction is denoted by W, and a distance between the first optical axis and a portion of the second holding member, which is closest to the first optical axis, is denoted by R1 in an interference region where the second holding member housing the second optical system protrudes toward the housing from the barrel-mounting surface.

15. The projector according to claim 14, wherein the housing includes a corner where the upper end and the one side surface cross each other, and
a relationship of "L<R1" is satisfied in a case in which a distance between the first optical axis and the corner is denoted by L.

16. The projector according to claim 14,
wherein relationships of "R2<H1" and "R2<H2" are satisfied in a case in which a distance between the first optical axis and a lower end of the housing in the up-down direction is denoted by H2 and a distance between the third optical axis and a maximum outer diameter of the second holding member in a radial direction is denoted by R2.

17. The projector according to claim 13, further comprising:
an angle adjustment mechanism adjusting the lens barrel rotationally relative to the barrel mounting surface.

18. The projector according to claim 14, further comprising:
an angle adjustment mechanism adjusting the lens barrel rotationally relative to the barrel mounting surface.

19. The projector according to claim 15, further comprising:
an angle adjustment mechanism adjusting the lens barrel rotationally relative to the barrel mounting surface.

20. The projector according to claim 16, further comprising:
an angle adjustment mechanism adjusting the lens barrel rotationally relative to the barrel mounting surface.

* * * * *